(12) United States Patent
Uchida et al.

(10) Patent No.: US 12,451,789 B2
(45) Date of Patent: Oct. 21, 2025

(54) MAGNETIC STRAIN WAVE GEAR DEVICE

(71) Applicants: Mitsubishi Electric Corporation, Tokyo (JP); OSAKA UNIVERSITY, Suita (JP)

(72) Inventors: Yosuke Uchida, Tokyo (JP); Ryoji Miyatake, Tokyo (JP); Atsushi Yamamoto, Tokyo (JP); Haruyuki Kometani, Tokyo (JP); Noboru Niguchi, Suita (JP); Katsuhiro Hirata, Suita (JP); Kazuaki Takahara, Suita (JP); Hironori Suzuki, Suita (JP); Takuya Ito, Suita (JP)

(73) Assignees: Mitsubishi Electric Corporation, Tokyo (JP); OSAKA University, Osaka (JP)

( * ) Notice: Subject to any disclaimer, the term of this patent is extended or adjusted under 35 U.S.C. 154(b) by 104 days.

(21) Appl. No.: 18/551,711

(22) PCT Filed: Aug. 2, 2021

(86) PCT No.: PCT/JP2021/028562
§ 371 (c)(1),
(2) Date: Sep. 21, 2023

(87) PCT Pub. No.: WO2023/012855
PCT Pub. Date: Feb. 9, 2023

(65) Prior Publication Data
US 2024/0097547 A1    Mar. 21, 2024

(51) Int. Cl.
*H02K 49/10* (2006.01)
*H02K 1/30* (2006.01)
*H02K 16/02* (2006.01)

(52) U.S. Cl.
CPC ............ *H02K 49/102* (2013.01); *H02K 1/30* (2013.01); *H02K 16/02* (2013.01)

(58) Field of Classification Search
CPC .. H02K 49/102; H02K 49/104; H02K 49/106; H02K 51/00; H02K 16/02; H02K 16/025; H02K 1/30; H02K 1/28
(Continued)

(56) References Cited

U.S. PATENT DOCUMENTS

2012/0094555 A1 * 4/2012 Calverley ................ H02K 7/11
440/6
2013/0002076 A1 * 1/2013 Iwasaki ................ H02K 49/102
310/103
(Continued)

FOREIGN PATENT DOCUMENTS

| JP | 2012039828 A | * | 2/2012 | ............... H02K 5/10 |
| JP | 2013011298 A | | 1/2013 | |
| JP | 2016135014 A | * | 7/2016 | ............. H02K 16/02 |

OTHER PUBLICATIONS

Machine translation of JP-2012039828-A. (Year: 2012).*
(Continued)

*Primary Examiner* — Michael Andrews
(74) *Attorney, Agent, or Firm* — BUCHANAN, INGERSOLL & ROONEY PC

(57) ABSTRACT

Provided is a magnetic strain wave gear device that makes it possible to achieve both improvement of the efficiency of assembly work and suppression of decrease in energy conversion efficiency. A magnetic strain wave gear device includes: a stator having a stator core, a stator winding, and a stator magnet; a first rotor; and a second rotor. The second rotor includes a second rotor core provided with a plurality of rotor magnet insertion holes and a plurality of rotor magnets inserted into the plurality of respective rotor magnet insertion holes. The first rotor includes a cylindrical first rotor core and a first rotor end plate. The first rotor end plate has a rotor magnet passage hole through which the rotor
(Continued)

magnets can be inserted into the rotor insertion holes from outside in a direction of a rotation shaft.

6 Claims, 10 Drawing Sheets

(58) Field of Classification Search
USPC .......................................... 310/103–107, 114
See application file for complete search history.

(56) References Cited

U.S. PATENT DOCUMENTS

| | | | |
|---|---|---|---|
| 2016/0087517 A1* | 3/2016 | Powell | H02K 7/1823 |
| | | | 310/103 |
| 2024/0429805 A1* | 12/2024 | Okazaki | H02K 7/088 |

OTHER PUBLICATIONS

Machine translation of JP-2016135014-A. (Year: 2016).*
International Search Report (PCT/ISA/210) with English translation and Written Opinion (PCT/ISA/237) mailed on Sep. 7, 2021, by the Japanese Patent Office as the International Searching Authority for International Application No. PCT/JP2021/028562.

* cited by examiner

MAGNETIC STRAIN WAVE GEAR DEVICE

TECHNICAL FIELD

The present disclosure relates to a magnetic strain wave gear device.

BACKGROUND ART

A magnetic strain wave gear device having a magnetic speed reducer and a rotating machine integrated with each other has been known as an electric generator for a wind power generation device. The magnetic strain wave gear device is composed of: a low-speed rotor; a high-speed rotor provided coaxially with the low-speed rotor; and a stator having stator windings and permanent magnets. The magnetic strain wave gear device can change the rotation speeds of the rotors in a contactless manner without using any mechanical transmission that experiences mechanical wear. Consequently, burden in maintenance against mechanical wear is mitigated in the magnetic strain wave gear device. In addition, in the case of using the magnetic strain wave gear device as an electric generator for a wind power generation device, speed change and power generation can be performed with the single device, whereby downsizing and space saving of a power generation system can be achieved.

As a conventional magnetic strain wave gear device, a magnetic strain wave gear device has been disclosed in which a stator having a plurality of permanent magnets, a high-speed rotor having a plurality of rotor magnets, and a low-speed rotor having a plurality of magnetic pole pieces are concentrically arranged (see, for example, Patent Document 1).

CITATION LIST

Patent Document

Patent Document 1: Japanese Laid-Open Patent Publication No. 2016-135014

SUMMARY OF THE INVENTION

Problem to be Solved by the Invention

The plurality of permanent magnets of the stator are magnetized in a radial direction so as to form poles in the same direction. In the magnetic strain wave gear device, it is difficult to magnetize the rotor magnets of the high-speed rotor through current conduction to stator windings after the high-speed rotor is inserted into the stator. Thus, in the conventional magnetic strain wave gear device, a high-speed rotor having magnetized rotor magnets incorporated therein needs to be inserted into the stator. When such a high-speed rotor having magnetized rotor magnets incorporated therein is inserted into the stator, magnetic attraction forces are exerted between the permanent magnets of the stator and the rotor magnets of the high-speed rotor. The magnetic attraction forces serve as forces exerted with respect to the high-speed rotor in a direction perpendicular to the direction of the insertion. Consequently, the conventional magnetic strain wave gear device has a problem that it is difficult to accurately insert the high-speed rotor into the stator, whereby the efficiency of assembly work is low.

It is conceivable to widen the gap between the high-speed rotor and the stator in order to improve the efficiency of assembly work. However, when the gap between the high-speed rotor and the stator is widened, the intervals between the stator magnets and the rotor magnets are widened, whereby a problem arises in that the energy conversion efficiency of the magnetic strain wave gear device decreases. That is, the conventional magnetic strain wave gear device has a problem that it is impossible to achieve both improvement of the efficiency of assembly work and suppression of decrease in energy conversion efficiency.

The present disclosure has been made to solve the above problems, and an object of the present disclosure is to provide a magnetic strain wave gear device that makes it possible to achieve both improvement of the efficiency of assembly work and suppression of decrease in energy conversion efficiency.

Means to Solve the Problem

A magnetic strain wave gear device according to the present disclosure includes: a stator having a stator core provided with a plurality of slots in a circumferential direction, a stator winding disposed in each of the slots, and a stator magnet; a first rotor disposed radially inward of the stator with a gap interposed therebetween; and a second rotor disposed radially inward of the first rotor with a gap interposed therebetween, the second rotor being concentric with a rotation shaft of the first rotor. The second rotor includes a second rotor core provided with a plurality of rotor magnet insertion holes arrayed in the circumferential direction and a plurality of rotor magnets inserted into the plurality of respective rotor magnet insertion holes, the first rotor includes a first rotor core having a cylindrical shape and a first rotor end plate fastening the first rotor core and the rotation shaft to each other and located outward of the second rotor in a direction of the rotation shaft, and the first rotor end plate has a rotor magnet passage hole through which the rotor magnets can be inserted into the rotor magnet insertion holes of the second rotor core from outside in the direction of the rotation shaft.

Effect of the Invention

In the magnetic strain wave gear device according to the present disclosure, the first rotor end plate has a rotor magnet passage hole through which the rotor magnets can be inserted into the rotor insertion holes of the second rotor core from outside in the direction of the rotation shaft. Consequently, the rotor magnets can be inserted into the rotor insertion holes of the second rotor core after the second rotor core is inserted to the inner circumferential side relative to the stator. Therefore, the magnetic strain wave gear device according to the present disclosure makes it possible to achieve both improvement of the efficiency of assembly work and suppression of decrease in energy conversion efficiency.

DESCRIPTION OF EMBODIMENTS

Figure 1:
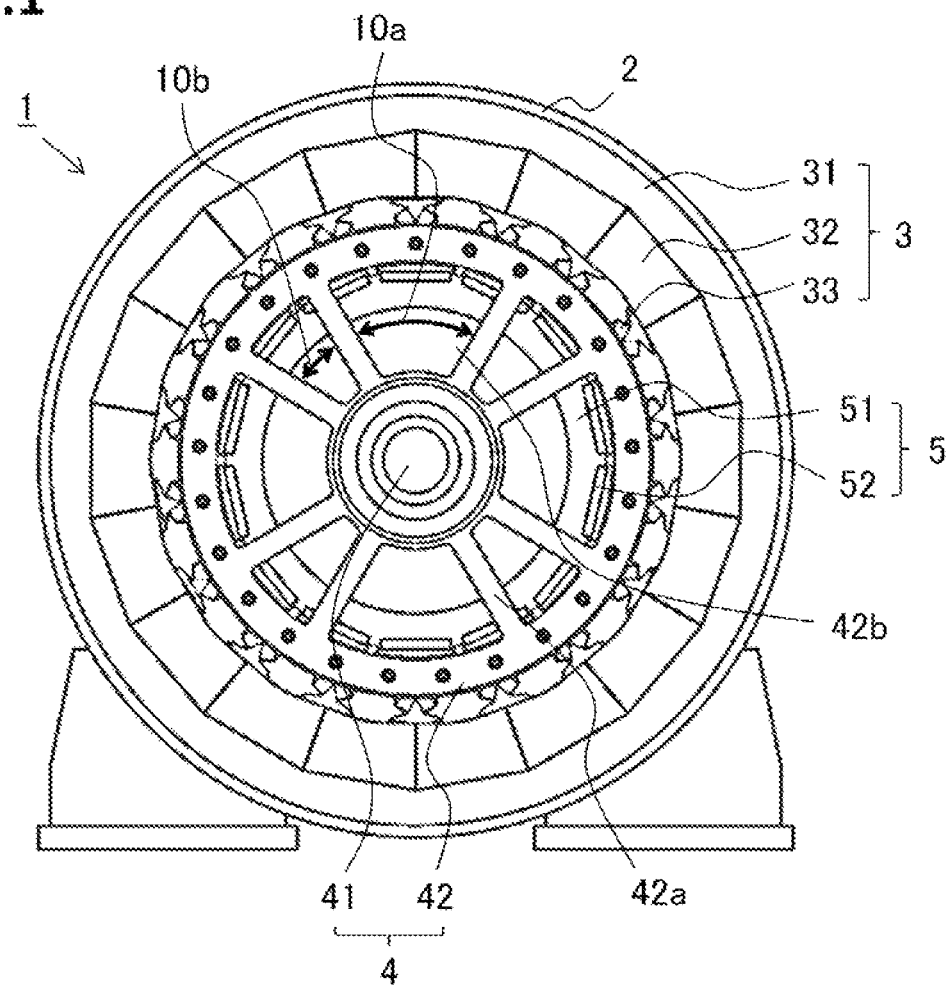
FIG. 1 is a front view of a magnetic strain wave gear device according to embodiment 1.

Hereinafter, magnetic strain wave gear devices according to embodiments for carrying out the present disclosure will be described in detail with reference to the drawings. The same or corresponding constituents in the drawings are denoted by the same reference characters.

Embodiment 1

FIG. 1 is a front view of a magnetic strain wave gear device according to embodiment 1. A magnetic strain wave gear device 1 according to the present embodiment includes a frame 2 having a cylindrical shape, a stator 3, a low-speed rotor 4, and a high-speed rotor 5. The stator 3 includes: a stator core 31 provided with a plurality of slots in a circumferential direction; stator windings 32 disposed in the slots; and stator magnets 33. The stator 3 is fixed to the frame 2 on the inner circumferential side relative to the frame 2. The low-speed rotor 4 has a low-speed rotor core having a cylindrical shape and disposed radially inward of the stator 3 with a gap interposed therebetween. The high-speed rotor 5 is disposed radially inward of the low-speed rotor core with a gap interposed therebetween and is concentric with a rotation shaft 41 of the low-speed rotor 4. The high-speed rotor 5 includes a high-speed rotor core 51 having a cylindrical shape and rotor magnets 52 arrayed in the circumferential direction. The low-speed rotor 4 includes a low-speed rotor end plate 42 fastening the low-speed rotor core and the rotation shaft 41 to each other and located outward of the high-speed rotor 5 in a direction of the rotation shaft 41. As shown in FIG. 1, the low-speed rotor end plate 42 in the present embodiment is composed of a plurality of spokes 42a. The intervals between the plurality of spokes 42a are openings.

Figure 2:
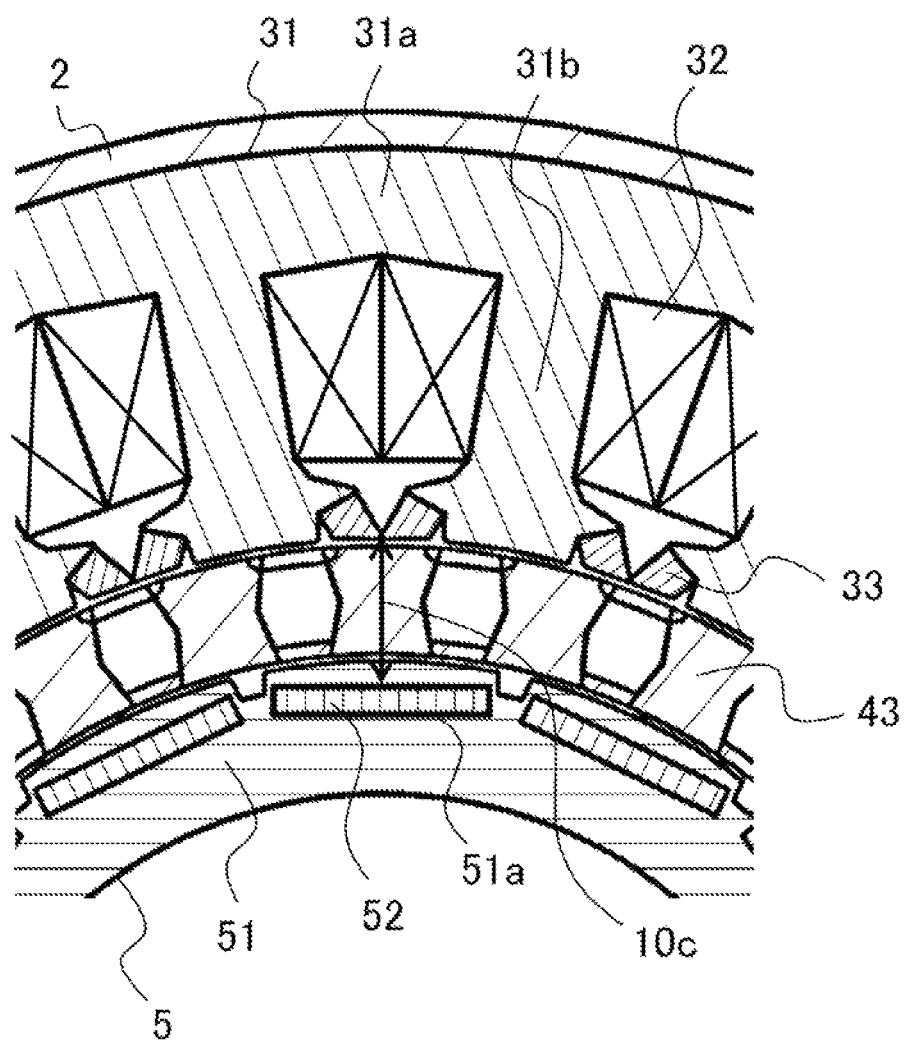
FIG. 2 is a partial cross-sectional view of the magnetic strain wave gear device according to embodiment 1.

FIG. 2 is a partial cross-sectional view of the magnetic strain wave gear device according to the present embodiment. As shown in FIG. 2, the stator core 31 is composed of: a core back 31a having a cylindrical shape; and a plurality of teeth 31b protruding from the core back to the inner circumferential side so as to be arrayed in the circumferential direction. The intervals between the plurality of teeth 31b are spaces called slots, and the stator windings 32 are wound on the teeth 31b by utilizing the slots. The stator magnets 33 are fixed to both end portions of the teeth 31b on the inner circumferential side relative to the slots. A low-speed rotor core 43 is disposed radially inward of the stator 3 with a gap interposed therebetween. The high-speed rotor core 51 is disposed radially inward of the low-speed rotor core 43 with a gap interposed therebetween. The high-speed rotor core 51 has a plurality of rotor magnet insertion holes 51a formed on the outer circumferential side thereof so as to be arrayed in the circumferential direction. The plurality of rotor magnets 52 are inserted into the plurality of respective rotor magnet insertion holes 51a.

In the magnetic strain wave gear device 1 according to the present embodiment, the low-speed rotor end plate 42 has rotor magnet passage holes 42b through which the rotor magnets 52 can be inserted into the rotor magnet insertion holes 51a from outside in the direction of the rotation shaft 41, as shown in FIG. 1. The low-speed rotor end plate 42 in the present embodiment is composed of the plurality of spokes, and thus, as shown in FIG. 1, opening widths 10a and 10b between the plurality of spokes 42a of the low-speed rotor end plate 42 are irregular pitches. The opening width 10a of each interval that is larger out of the intervals between the spokes 42a is set to be larger than the width of each of the rotor magnet insertion holes 51a, whereby the opening between corresponding ones of the spokes 42a serves as a rotor magnet passage hole 42b.

Next, a method for assembling the magnetic strain wave gear device according to the present embodiment will be described. The stator windings 32 and the stator magnets 33 are attached to the stator core 31, to assemble the stator 3. This stator 3 is fixed to the inner circumferential side of the frame 2. Next, the high-speed rotor core 51 is inserted, in the direction of the rotation shaft, to the inner circumferential side relative to the stator 3. At this time, the rotor magnets 52 have not been inserted into the rotor magnet insertion holes 51a of the high-speed rotor core 51. Next, the low-speed rotor 4 is inserted, in the direction of the rotation shaft, into the gap between the stator 3 and the high-speed rotor 5. Lastly, the rotor magnets 52 are caused to pass through the rotor magnet passage holes 42b of the low-speed rotor end plate 42 and are inserted into the rotor magnet insertion holes 51a of the high-speed rotor core 51.

Figure 3:
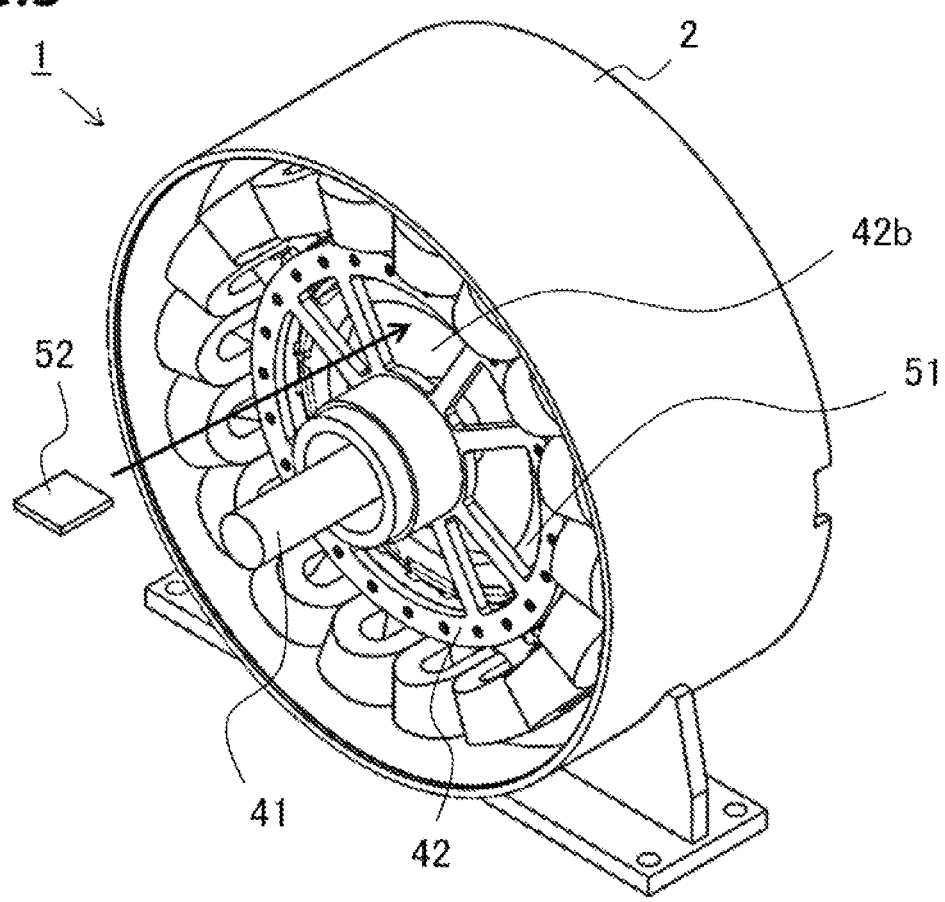
FIG. 3 is a perspective view of the magnetic strain wave gear device according to embodiment 1.

FIG. 3 is a perspective view of the magnetic strain wave gear device according to the present embodiment. As shown in FIG. 3, each of the rotor magnets 52 is caused to pass through the corresponding rotor magnet passage hole 42b of the low-speed rotor end plate 42 and is inserted into the corresponding rotor magnet insertion hole 51a of the high-speed rotor core 51.

In the magnetic strain wave gear device 1 which is thus configured, the rotor magnets 52 have not been inserted into the rotor magnet insertion holes 51a of the high-speed rotor core 51 when the high-speed rotor core 51 is inserted to the inner circumferential side relative to the stator 3. Consequently, no magnetic attraction forces are exerted between the stator magnets 33 and the rotor magnets 52 when the high-speed rotor core 51 is inserted. As a result, when the high-speed rotor core 51 is inserted, no force is exerted in a direction perpendicular to the direction of the insertion. Therefore, the high-speed rotor core 51 can be accurately inserted into the stator 3.

It is assumed that the rotor magnets 52 have been attached to the high-speed rotor core 51 when the high-speed rotor core 51 is inserted to the inner circumferential side relative to the stator 3. In this case, magnetic attraction forces are exerted between the stator magnets 33 and the rotor magnets 52 when the high-speed rotor core 51 is inserted. Thus, when the high-speed rotor core 51 is inserted, force is exerted with respect to the high-speed rotor core 51 in the direction perpendicular to the direction of the insertion. Consequently, accuracy of alignment in defiance of the force exerted, when the high-speed rotor core 51 is inserted to the inner circumferential side relative to the stator 3, in the direction perpendicular to the direction of the insertion is required, whereby the efficiency of assembly work decreases. It is conceivable to widen the gap between the high-speed rotor core 51 and the stator 3 in order to improve the efficiency of assembly work. However, when the gap is widened, the intervals between the stator magnets 33 and the rotor magnets 52 are widened, whereby a problem arises in that the energy conversion efficiency of the magnetic strain wave gear device decreases. That is, the conventional method in which the high-speed rotor core 51 is inserted to the inner circumferential side relative to the stator 3 in a state where the rotor magnets 52 have been attached to the high-speed rotor core 51 has a problem that it is impossible to achieve both improvement of the efficiency of assembly work and suppression of decrease in energy conversion efficiency.

As described above, in the magnetic strain wave gear device according to the present embodiment, the rotor magnets can be caused to pass through the rotor magnet passage holes provided to the low-speed rotor end plate and can be inserted into the rotor magnet insertion holes of the high-speed rotor core after the high-speed rotor core to which the rotor magnets have not been attached is inserted to the inner circumferential side relative to the stator. Consequently, it is possible to achieve both improvement of the efficiency of assembly work and suppression of decrease in energy conversion efficiency.

In addition, in the magnetic strain wave gear device according to the present embodiment, the high-speed rotor core 51 can be inserted to the inner circumferential side relative to the stator 3 such that the gap between the high-speed rotor core 51 and the stator 3 is narrowed. Consequently, an interval 10c (shown in FIG. 2) between each stator magnet 33 and the corresponding rotor magnet 52 can be narrowed, whereby the use amount of rotor magnets necessary for obtaining the same energy conversion efficiency as that in the conventional method can also be decreased.

Embodiment 2

Figure 4:
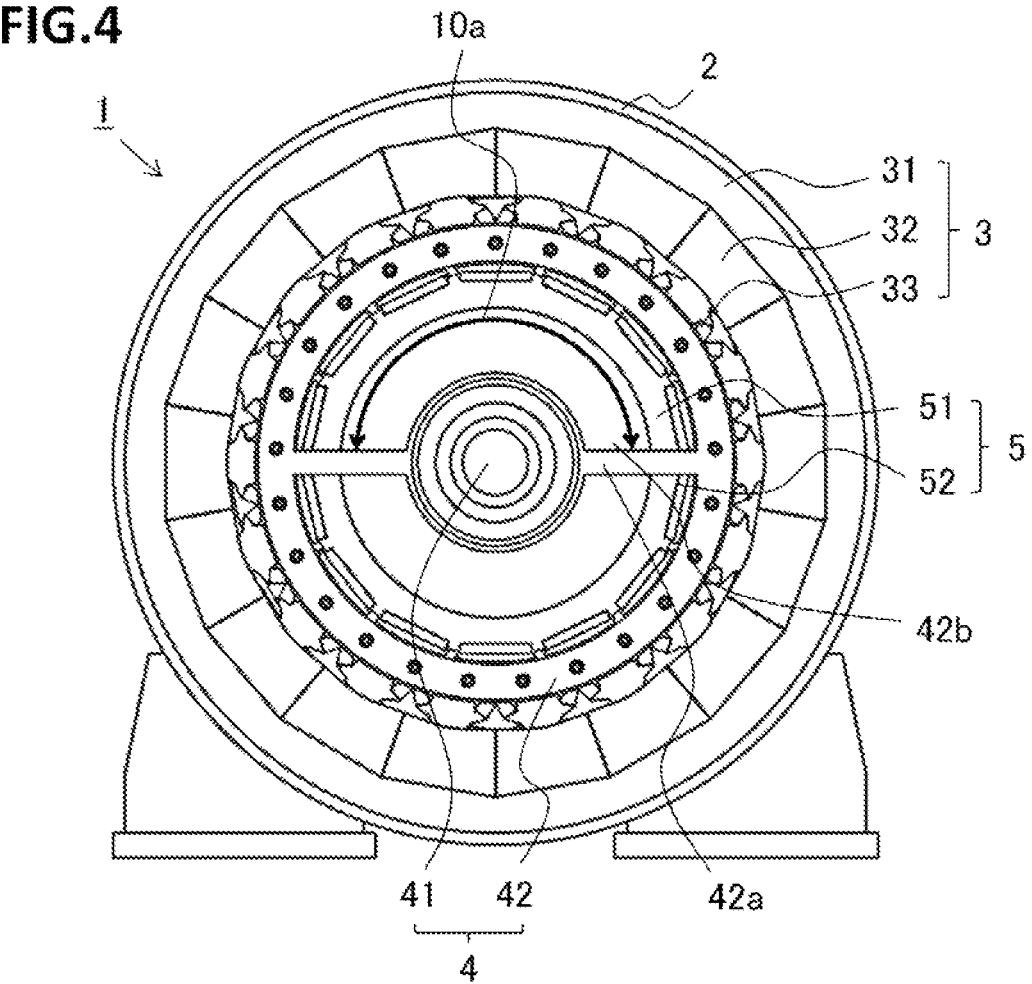
FIG. 4 is a front view of a magnetic strain wave gear device according to embodiment 2.

FIG. 4 is a front view of a magnetic strain wave gear device according to embodiment 2. The magnetic strain wave gear device 1 according to the present embodiment is the same as the magnetic strain wave gear device according to embodiment 1, except for the shape of the low-speed rotor end plate 42.

In the magnetic strain wave gear device according to embodiment 1, the opening widths between the spokes of the low-speed rotor end plate are irregular pitches, and the opening width that is larger out of the opening widths between the spokes is set to be larger than the width of each of the rotor magnet insertion holes. In the magnetic strain wave gear device according to the present embodiment, as shown in FIG. 4, a low-speed rotor end plate 42 is composed of two spokes 42a with the opening widths 10a between the spokes being regular pitches, and the openings between the two spokes serve as rotor magnet passage holes 42b. The opening widths 10a, between the spokes 42a, which are regular pitches are set to be larger than the width of each of the rotor magnet insertion holes 51a.

In the magnetic strain wave gear device which is thus configured, the rotor magnets can be caused to pass through the rotor magnet passage holes 42b provided to the low-speed rotor end plate 42 and can be inserted into the rotor magnet insertion holes of the high-speed rotor core after the high-speed rotor core to which the rotor magnets have not been attached is inserted to the inner circumferential side relative to the stator, in the same manner as in embodiment 1. Consequently, it is possible to achieve both improvement of the efficiency of assembly work and suppression of decrease in energy conversion efficiency.

In the present embodiment, the low-speed rotor end plate 42 is composed of the two spokes 42a arranged at regular pitches. The number of the spokes 42a of the low-speed rotor end plate 42 may be three or more as long as the opening widths, between the spokes, which are regular pitches are set to be larger than the width of each of the rotor magnet insertion holes.

Embodiment 3

Figure 5:
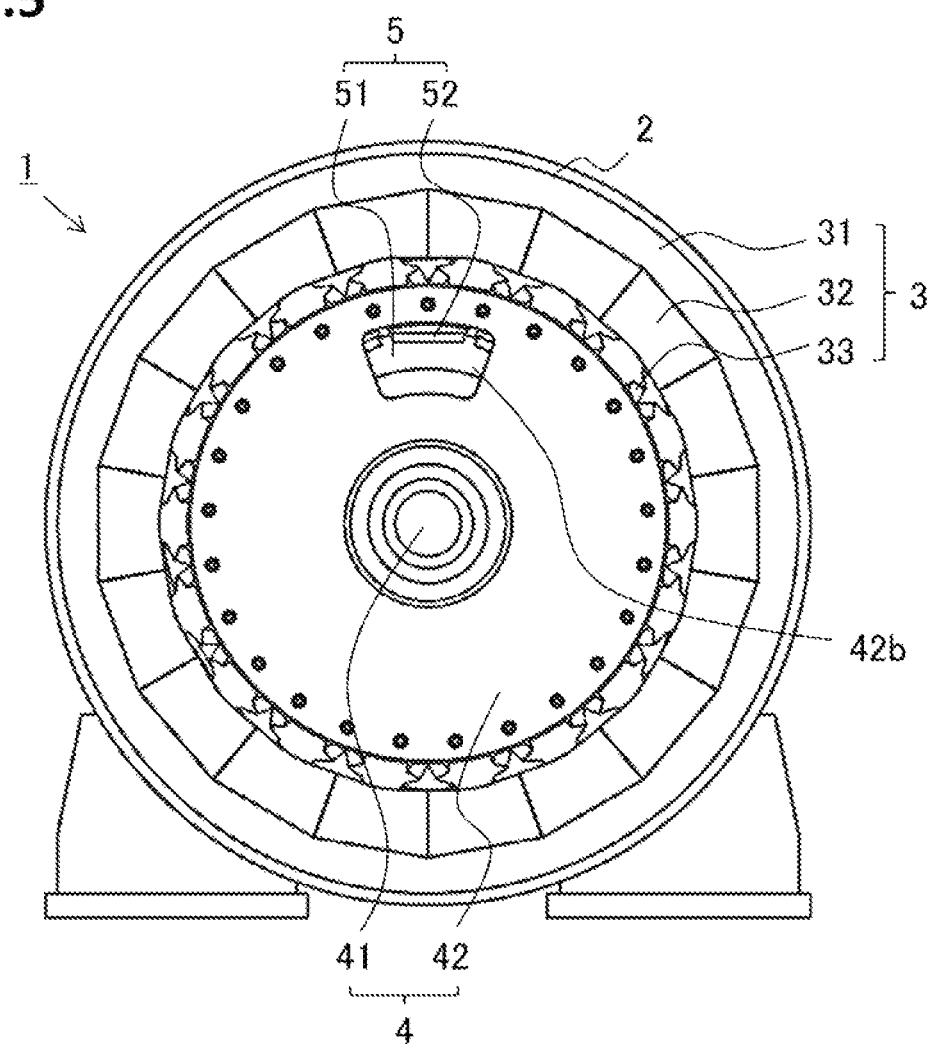
FIG. 5 is a front view of a magnetic strain wave gear device according to embodiment 3.

FIG. 5 is a front view of a magnetic strain wave gear device according to embodiment 3. The magnetic strain wave gear device 1 according to the present embodiment is the same as the magnetic strain wave gear device according to embodiment 1, except for the shape of the low-speed rotor end plate 42.

In the magnetic strain wave gear device according to the present embodiment, as shown in FIG. 5, a low-speed rotor end plate 42 has a disc shape, and an opening having an opening width larger than the width of each of the rotor magnet insertion holes is formed in a portion of the low-speed rotor end plate 42. In the magnetic strain wave gear device according to the present embodiment, this opening serves as a rotor magnet passage hole 42b.

In the magnetic strain wave gear device which is thus configured, the rotor magnets can be caused to pass through the rotor magnet passage hole 42b provided to the low-speed rotor end plate 42 and can be inserted into the rotor magnet insertion holes of the high-speed rotor core after the high-speed rotor core to which the rotor magnets have not been attached is inserted to the inner circumferential side relative to the stator, in the same manner as in embodiment 1. Consequently, it is possible to achieve both improvement of the efficiency of assembly work and suppression of decrease in energy conversion efficiency.

In the present embodiment, the low-speed rotor end plate 42 has one rotor magnet passage hole 42b. In order to ensure rotational symmetry of the low-speed rotor end plate 42, another rotor magnet passage hole having the same shape may be formed at a position that is rotationally symmetric with the one rotor magnet passage hole 42b.

Embodiment 4

In each of the magnetic strain wave gear devices according to embodiments 1 to 3, the low-speed rotor end plate has a rotor magnet passage hole, and thus the rotor magnets can be inserted into the rotor magnet insertion holes of the high-speed rotor core after the high-speed rotor core is inserted to the inner circumferential side relative to the stator. Consequently, the intervals between the stator magnets and the rotor magnets can be narrowed. However, narrower intervals between the stator magnets and the rotor magnets lead to a greater loss arising from eddy current generated in the surfaces of the rotor magnets by influence of magnetic fluxes inflicted from the stator magnets. When the loss arising from the eddy current increases, the energy conversion efficiency of the magnetic strain wave gear device decreases. The loss arising from the eddy current is referred to as eddy-current loss. A magnetic strain wave gear device according to embodiment 4 enables decrease of the eddy-current loss in the rotor magnets.

Figure 6:
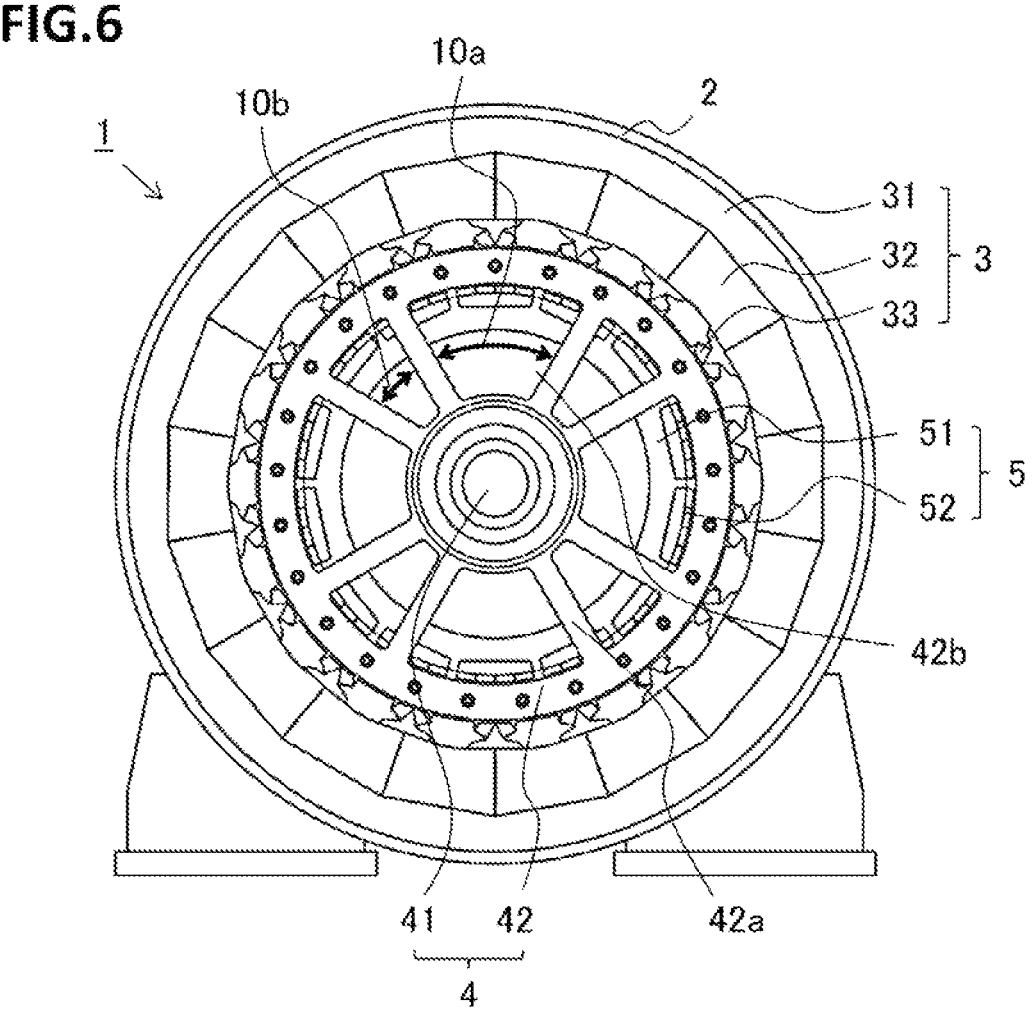
FIG. 6 is a front view of a magnetic strain wave gear device according to embodiment 4.

FIG. 6 is a front view of the magnetic strain wave gear device according to the present embodiment. The magnetic strain wave gear device 1 according to the present embodiment is the same as the magnetic strain wave gear device according to embodiment 1, except for the rotor magnets 52.

Figure 7:
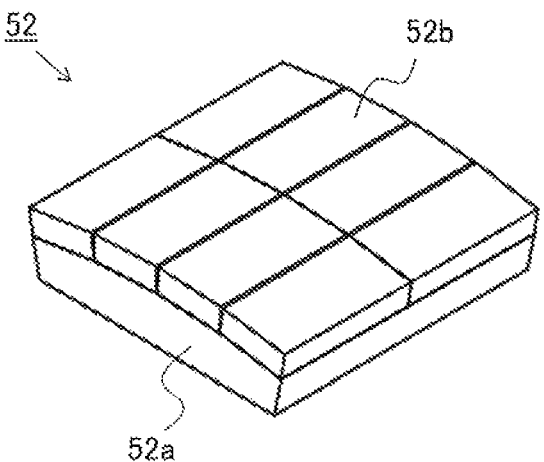
FIG. 7 is a configuration diagram of a rotor magnet according to embodiment 4.

FIG. 7 is a configuration diagram of a rotor magnet in the present embodiment. As shown in FIG. 7, the rotor magnet 52 in the present embodiment is composed of a base 52a and a plurality of division magnet pieces 52b fixed to the outer circumferential side of the base 52a. The base 52a is made from, for example, a magnetic material such as iron. The plurality of division magnet pieces 52b are arrayed in the circumferential direction and an axial direction of the high-speed rotor 5 and fixed to the base 52a. Gaps are present between the division magnet pieces 52b. Hereinafter, the rotor magnet 52 composed of the base 52a and the plurality of division magnet pieces 52b fixed to the outer circumferential side of the base 52a is referred to as a modularized rotor magnet.

In the magnetic strain wave gear device which is thus configured, each of the rotor magnets 52 includes the division magnet pieces 52b, and thus the apparent electric conductivity of the surface of the rotor magnet 52 through which eddy current flows decreases. Consequently, eddy current becomes less likely to flow, whereby the eddy-current loss in the rotor magnet 52 can be decreased.

Figure 8:
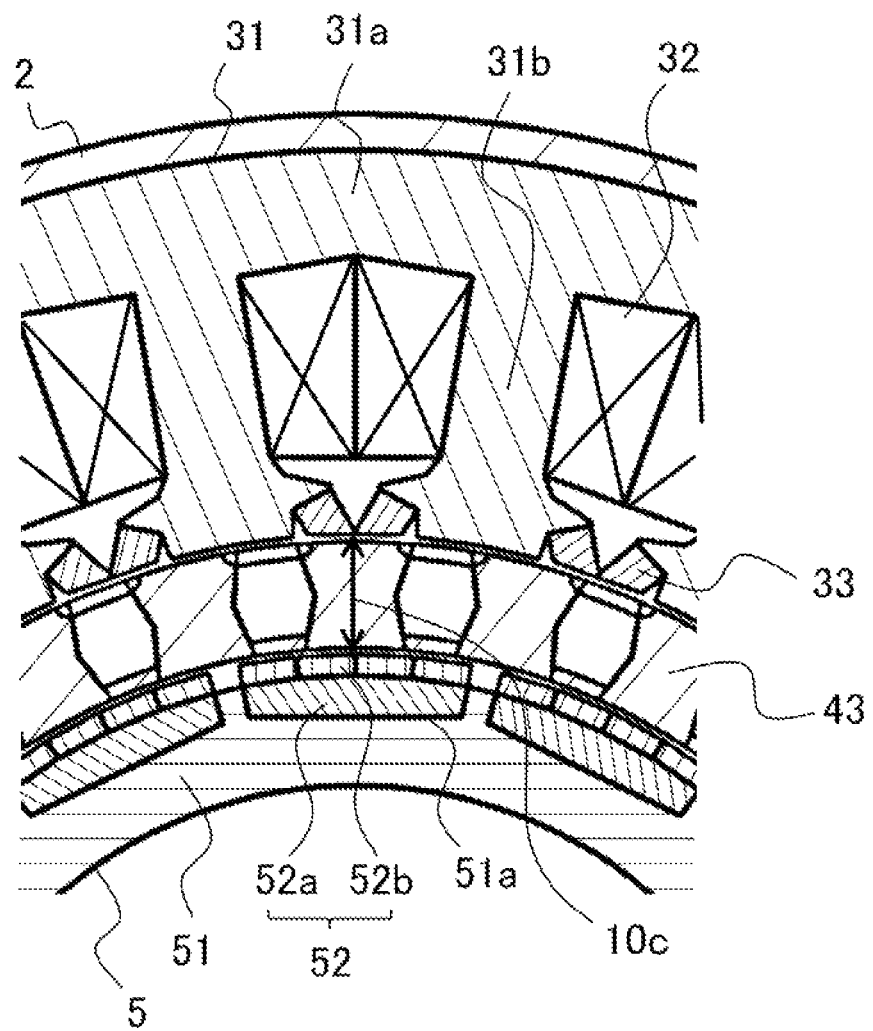
FIG. 8 is a partial cross-sectional view of the magnetic strain wave gear device according to embodiment 4.

FIG. 8 is a partial cross-sectional view of the magnetic strain wave gear device according to the present embodiment. In the magnetic strain wave gear device according to the present embodiment, the interval 10c between the stator magnet 33 and the rotor magnet 52 can be further narrowed as compared to a case where the rotor magnet is not modularized, under the designing condition that the eddy-current loss is set to be not larger than a certain value. Consequently, the use amount of rotor magnets necessary for obtaining the same energy conversion efficiency can be further decreased.

Figure 9:
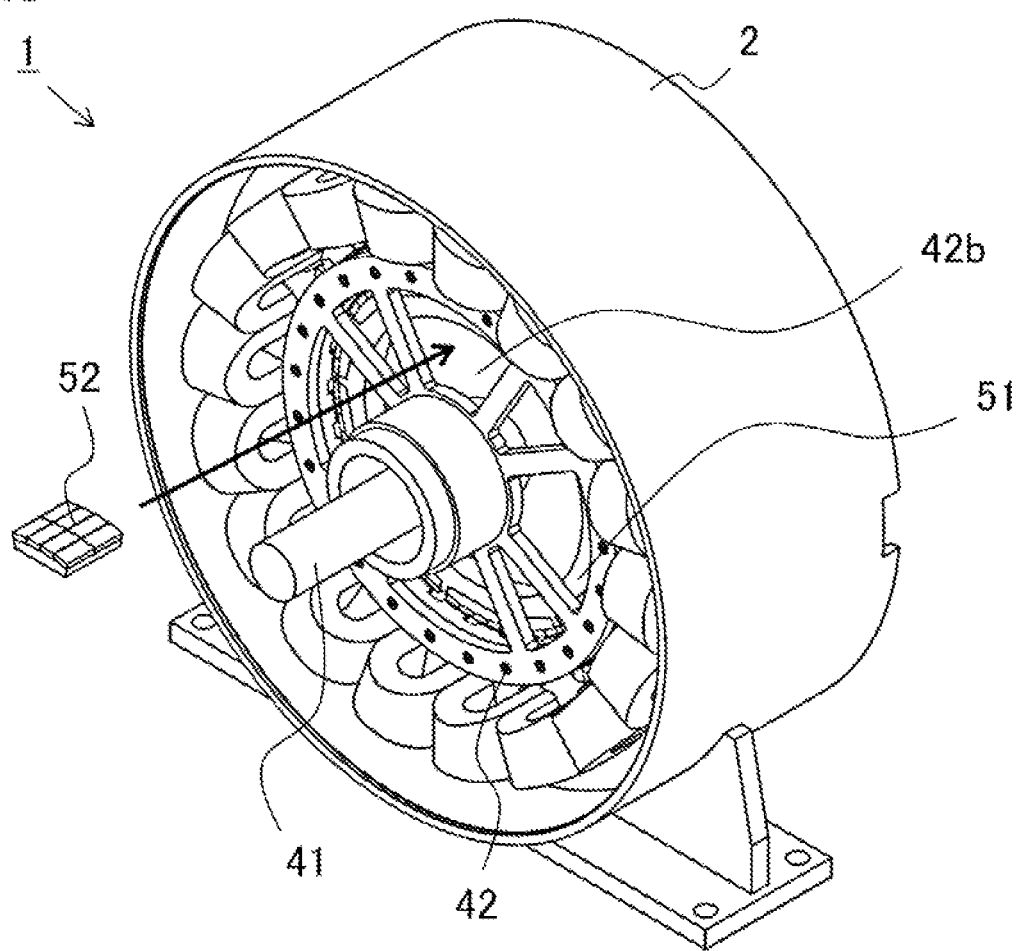
FIG. 9 is a perspective view of the magnetic strain wave gear device according to embodiment 4.

FIG. 9 is a perspective view of the magnetic strain wave gear device according to the present embodiment. As shown in FIG. 9, the modularized rotor magnet 52 is caused to pass through the corresponding rotor magnet passage hole 42b of the low-speed rotor end plate 42 and is inserted into the corresponding rotor magnet insertion hole 51a of the high-speed rotor core 51.

In the magnetic strain wave gear device 1 which is thus configured, the rotor magnets 52 have not been inserted into the rotor magnet insertion holes 51a of the high-speed rotor core 51 when the high-speed rotor core 51 is inserted to the inner circumferential side relative to the stator 3. Consequently, no magnetic attraction forces are exerted between the stator magnets 33 and the rotor magnets 52 when the high-speed rotor core 51 is inserted. As a result, when the high-speed rotor core 51 is inserted, no force is exerted in the direction perpendicular to the direction of the insertion. Therefore, the high-speed rotor core 51 can be accurately inserted into the stator 3. Consequently, the magnetic strain wave gear device according to the present embodiment makes it possible to achieve both improvement of the efficiency of assembly work and suppression of decrease in energy conversion efficiency, in the same manner as in embodiment 1.

In addition, in the magnetic strain wave gear device which is thus configured, each of the rotor magnets 52 includes the division magnet pieces 52b, whereby the eddy-current loss in the rotor magnet 52 can be decreased.

Embodiment 5

Figure 10:
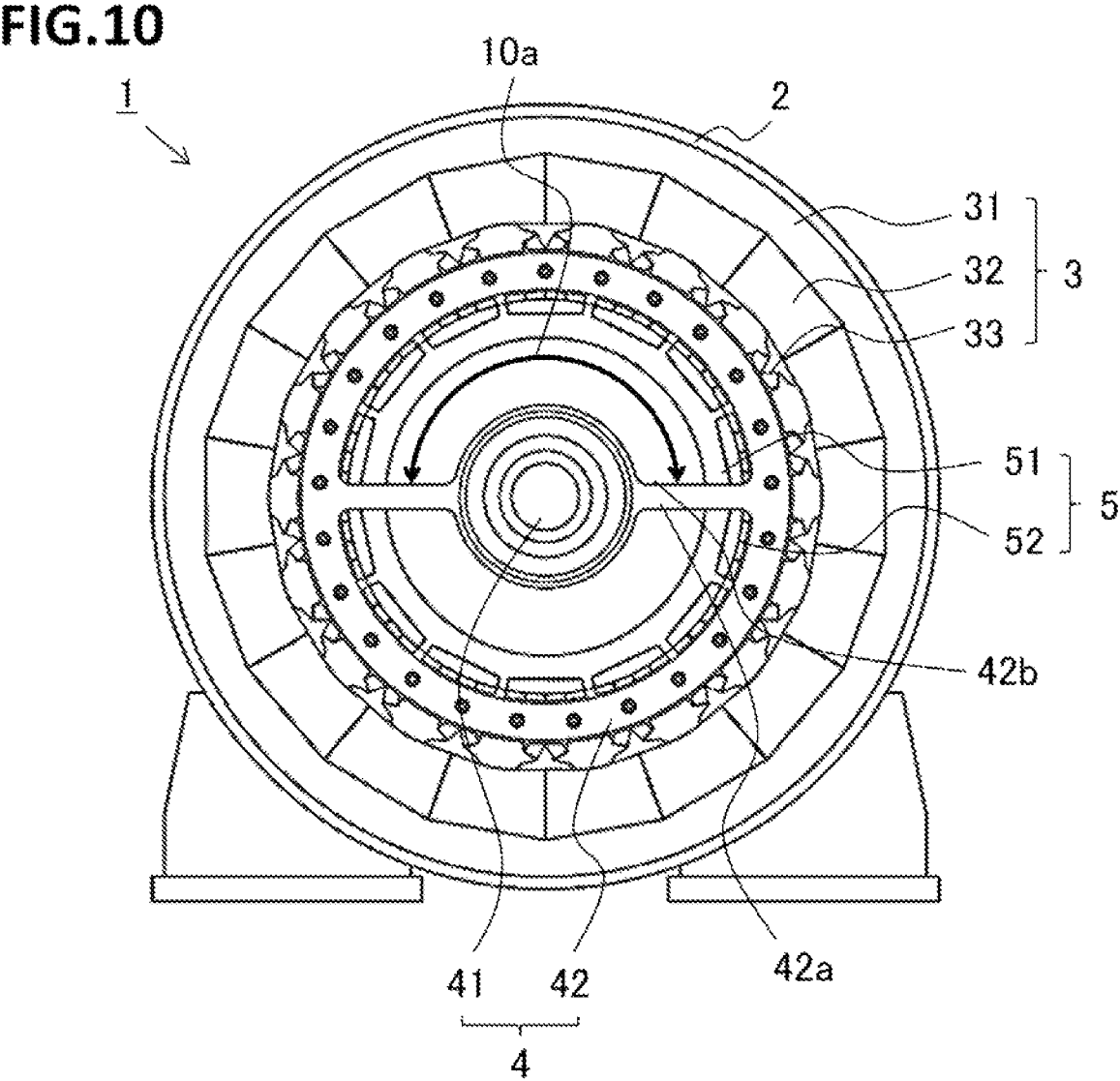
FIG. 10 is a front view of a magnetic strain wave gear device according to embodiment 5.

FIG. 10 is a front view of a magnetic strain wave gear device according to embodiment 5. The magnetic strain wave gear device 1 according to the present embodiment is the same as the magnetic strain wave gear device according to embodiment 4, except for the shape of the low-speed rotor end plate 42. In the magnetic strain wave gear device according to the present embodiment, each of the rotor magnets 52 is modularized in the same manner as in embodiment 4.

Similar to the low-speed rotor end plate in embodiment 2, a low-speed rotor end plate 42 in the present embodiment is composed of two spokes with the opening widths 10a between the spokes 42a being regular pitches, and the spaces between the two spokes serve as rotor magnet passage holes 42b. The opening widths 10a, between the spokes, which are regular pitches are set to be larger than the width of each of the rotor magnet insertion holes 51a.

In the magnetic strain wave gear device which is thus configured, the rotor magnets 52 can be caused to pass through the rotor magnet passage holes 42b provided to the low-speed rotor end plate 42 and can be inserted into the rotor magnet insertion holes of the high-speed rotor core after the high-speed rotor core to which the rotor magnets have not been attached is inserted to the inner circumferential side relative to the stator, in the same manner as in embodiment 2. Consequently, it is possible to achieve both improvement of the efficiency of assembly work and suppression of decrease in energy conversion efficiency.

In addition, in the magnetic strain wave gear device according to the present embodiment, each of the rotor magnets 52 is modularized in the same manner as in embodiment 4, whereby the eddy-current loss in the rotor magnet 52 can be decreased.

Embodiment 6

Figure 11:
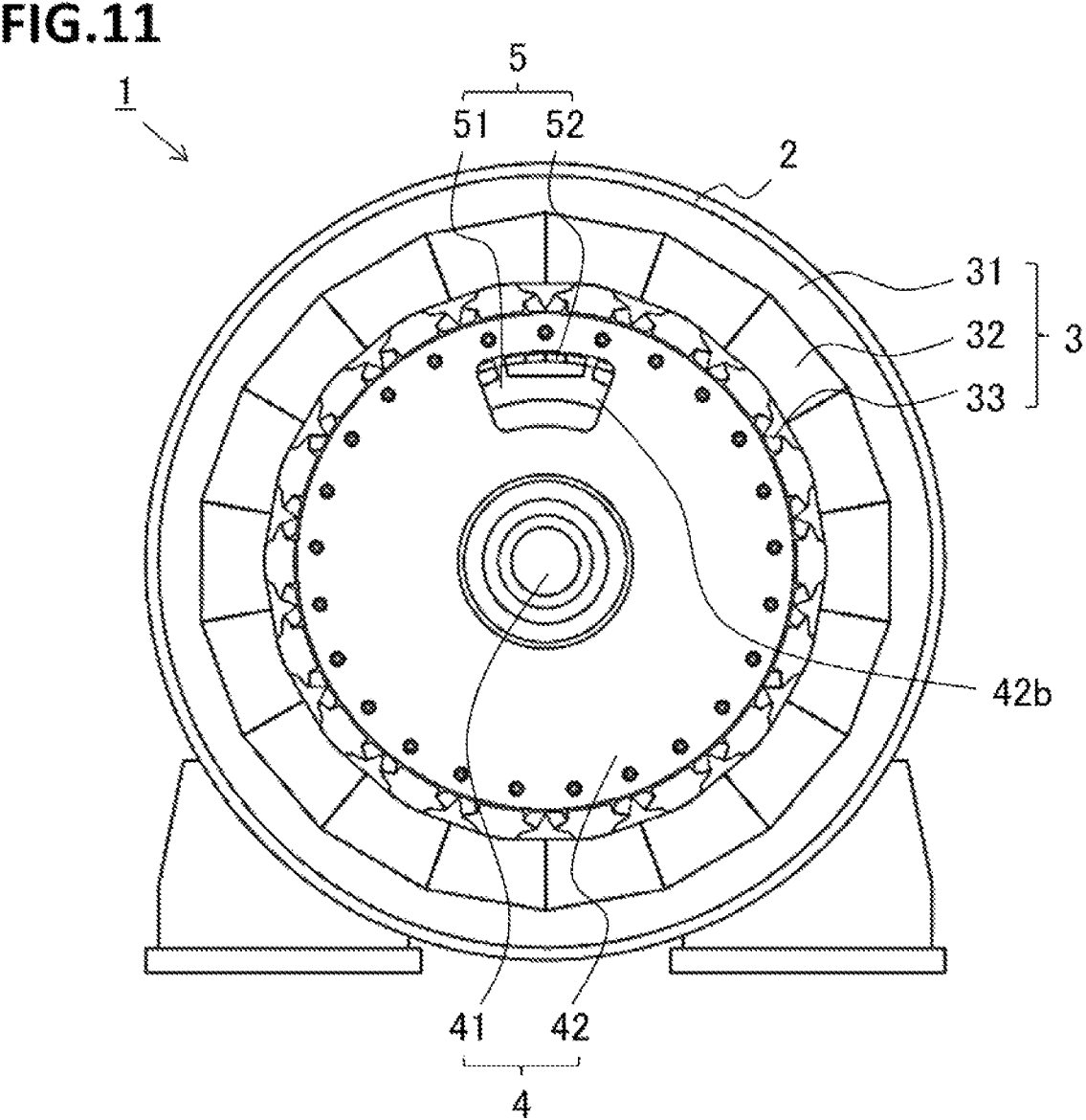
FIG. 11 is a front view of a magnetic strain wave gear device according to embodiment 6.

FIG. 11 is a front view of a magnetic strain wave gear device according to embodiment 6. The magnetic strain wave gear device 1 according to the present embodiment is the same as the magnetic strain wave gear device according to embodiment 4, except for the shape of the low-speed rotor end plate 42. In the magnetic strain wave gear device according to the present embodiment, each of the rotor magnets 52 is modularized in the same manner as in embodiment 4.

Similar to the low-speed rotor end plate in embodiment 3, a low-speed rotor end plate 42 in the present embodiment has a plate shape, and an opening having an opening width larger than the width of each of the rotor magnet insertion holes is formed in a portion of the low-speed rotor end plate 42. In the magnetic strain wave gear device according to the present embodiment, this opening serves as a rotor magnet passage hole 42b.

In the magnetic strain wave gear device which is thus configured, the rotor magnets can be caused to pass through the rotor magnet passage hole 42b provided to the low-speed rotor end plate 42 and can be inserted into the rotor magnet insertion holes of the high-speed rotor core after the high-speed rotor core to which the rotor magnets have not been attached is inserted to the inner circumferential side relative to the stator, in the same manner as in embodiment 3. Consequently, it is possible to achieve both improvement of the efficiency of assembly work and suppression of decrease in energy conversion efficiency.

In addition, in the magnetic strain wave gear device according to the present embodiment, each of the rotor magnets 52 is modularized in the same manner as in embodiment 4, whereby the eddy-current loss in the rotor magnet 52 can be decreased.

In each of embodiments 4 to 6, the rotor magnets 52 are modularized. Thus, when the rotor magnets 52 are caused to pass through the rotor magnet passage holes 42b and are inserted into the rotor magnet insertion holes 51a of the high-speed rotor core, the division magnet pieces 52b are not separated, whereby the rotor magnets 52 are easily inserted. Each of the modularized rotor magnets 52 does not have to be provided with any base 52a as long as the division magnet piece 52b can be inserted into the corresponding rotor magnet insertion hole 51a. In addition, in each of embodiments 4 to 6, the division magnet pieces 52b are arrayed in the circumferential direction and the axial direction of the high-speed rotor 5. The division magnet pieces 52b may be arrayed in at least one of the circumferential direction and the axial direction of the high-speed rotor 5.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 magnetic strain wave gear device
2 frame
3 stator
4 low-speed rotor
5 high-speed rotor
10a, 10b opening width
10c interval
31 stator core
31a core back
31b tooth
32 stator winding
33 stator magnet
41 rotation shaft
42 low-speed rotor end plate
42a spoke
42b rotor magnet passage hole
43 low-speed rotor core
51 high-speed rotor core
51a rotor magnet insertion hole
52 rotor magnet
52a base
52b division magnet piece

The invention claimed is:

1. A magnetic strain wave gear device comprising:
a stator having
a stator core provided with a plurality of slots in a circumferential direction,
a stator winding disposed in each of the slots, and
a stator magnet;
a first rotor disposed radially inward of the stator with a gap interposed therebetween; and
a second rotor disposed radially inward of the first rotor with a gap interposed therebetween, the second rotor being concentric with a rotation shaft of the first rotor, wherein
the second rotor includes
a second rotor core provided with a plurality of rotor magnet insertion holes arrayed in the circumferential direction and
a plurality of rotor magnets inserted into the plurality of respective rotor magnet insertion holes,
the first rotor includes
a first rotor core having a cylindrical shape and
a first rotor end plate fastening the first rotor core and the rotation shaft to each other and located outward of the second rotor in a direction of the rotation shaft, and
the first rotor end plate has a rotor magnet passage hole through which the rotor magnets can be inserted into the rotor magnet insertion holes of the second rotor core from outside in the direction of the rotation shaft.

2. The magnetic strain wave gear device according to claim 1, wherein each of the rotor magnets includes a plurality of division magnet pieces arrayed in at least one of the circumferential direction and an axial direction of the second rotor.

3. The magnetic strain wave gear device according to claim 2, wherein
the first rotor end plate has a shape with a plurality of spokes,
a width of at least one of openings between the plurality of spokes is larger than a width of each of the rotor magnet insertion holes, and
the one opening is the rotor magnet passage hole.

4. The magnetic strain wave gear device according to claim 2, wherein
the first rotor end plate has a disc shape,
the first rotor end plate has at least one opening having a width larger than a width of each of the rotor magnet insertion holes, and
the one opening is the rotor magnet passage hole.

5. The magnetic strain wave gear device according to claim 1, wherein
the first rotor end plate has a shape with a plurality of spokes,
a width of at least one of openings between the plurality of spokes is larger than a width of each of the rotor magnet insertion holes, and
the one opening is the rotor magnet passage hole.

6. The magnetic strain wave gear device according to claim 1 or 2, wherein
the first rotor end plate has a disc shape,
the first rotor end plate has at least one opening having a width larger than a width of each of the rotor magnet insertion holes, and
the one opening is the rotor magnet passage hole.

* * * * *